United States Patent
Roux

(10) Patent No.: US 7,158,821 B2
(45) Date of Patent: Jan. 2, 2007

(54) NODE AND ONBOARD STATION FOR SETTING UP AT ANY TIME A CALL INVOLVING A PASSENGER ON A VEHICLE

(75) Inventor: Raphaël Roux, deceased, late of Argenteuil (FR); by Josette Roux, legal representative, Argenteuil (FR)

(73) Assignee: Alcatel, Paris (FR)

( * ) Notice: Subject to any disclaimer, the term of this patent is extended or adjusted under 35 U.S.C. 154(b) by 234 days.

(21) Appl. No.: 10/803,981

(22) Filed: Mar. 19, 2004

(65) Prior Publication Data

US 2004/0198347 A1 Oct. 7, 2004

Related U.S. Application Data

(62) Division of application No. 09/537,568, filed on Mar. 30, 2000, now Pat. No. 6,754,489.

(30) Foreign Application Priority Data

Mar. 31, 1999 (FR) .................................... 99 04060

(51) Int. Cl.
*H04Q 7/20* (2006.01)
*H04Q 7/38* (2006.01)

(52) U.S. Cl. ................. 455/575.9; 455/431; 455/422.1; 455/406; 455/407; 455/408; 455/3.06; 455/403; 379/114.01; 379/114.03; 379/114.27; 379/114.13; 379/126; 379/127.05; 348/121; 348/123

(58) Field of Classification Search ................. 455/431, 455/422.1, 403, 404.1, 404.2, 500, 517, 550.1, 455/551, 412.1, 412.2, 406–408, 409, 445, 455/418, 419, 420, 3.03, 3.04, 3.05, 73, 575.9; 379/114.01, 114.03, 114.27, 114.13, 126, 379/127.05; 348/121, 123
See application file for complete search history.

(56) References Cited

U.S. PATENT DOCUMENTS

| 5,970,395 | A | * | 10/1999 | Weiler et al. ............ 455/67.13 |
| 6,006,084 | A | * | 12/1999 | Miller et al. ................ 455/406 |
| 6,269,243 | B1 | | 7/2001 | Corbefin et al. |
| 6,788,935 | B1 | * | 9/2004 | McKenna et al. .......... 455/431 |
| 6,799,037 | B1 | * | 9/2004 | Mielke et al. ........... 455/435.1 |

FOREIGN PATENT DOCUMENTS

| EP | 0 491 497 A1 | 6/1992 |
| GB | 2 310 973 A | 9/1997 |
| JP | 2-241192 A | 9/1990 |
| WO | WO 98/21838 A1 | 5/1998 |
| WO | WO 98/26521 A1 | 6/1998 |

\* cited by examiner

*Primary Examiner*—Keith Ferguson
(74) *Attorney, Agent, or Firm*—Sughrue Mion, PLLC

(57) ABSTRACT

Passengers on board a vehicle make and receive calls via a satellite network. That network sees each passenger involved in a call as a temporary dummy subscriber of the satellite network. Thus the satellite network is used to manage the roaming of passengers on aircraft. An intermediate network and the terrestrial mobile telephone network therefore do not need to manage the roaming of the aircraft. The terrestrial mobile telephone network sees each node of the intermediate network as a dummy base station and each passenger involved in a call as a dummy mobile subscriber of the terrestrial mobile telephone network, in the service area of one of the dummy base stations. The terrestrial fixed telephone network sees each passenger involved in a call as a subscriber of another fixed network managed by another operator. The intermediate network sees the satellite network as a standard terrestrial mobile telephone network, able to manage the roaming of its subscribers itself.

5 Claims, 3 Drawing Sheets

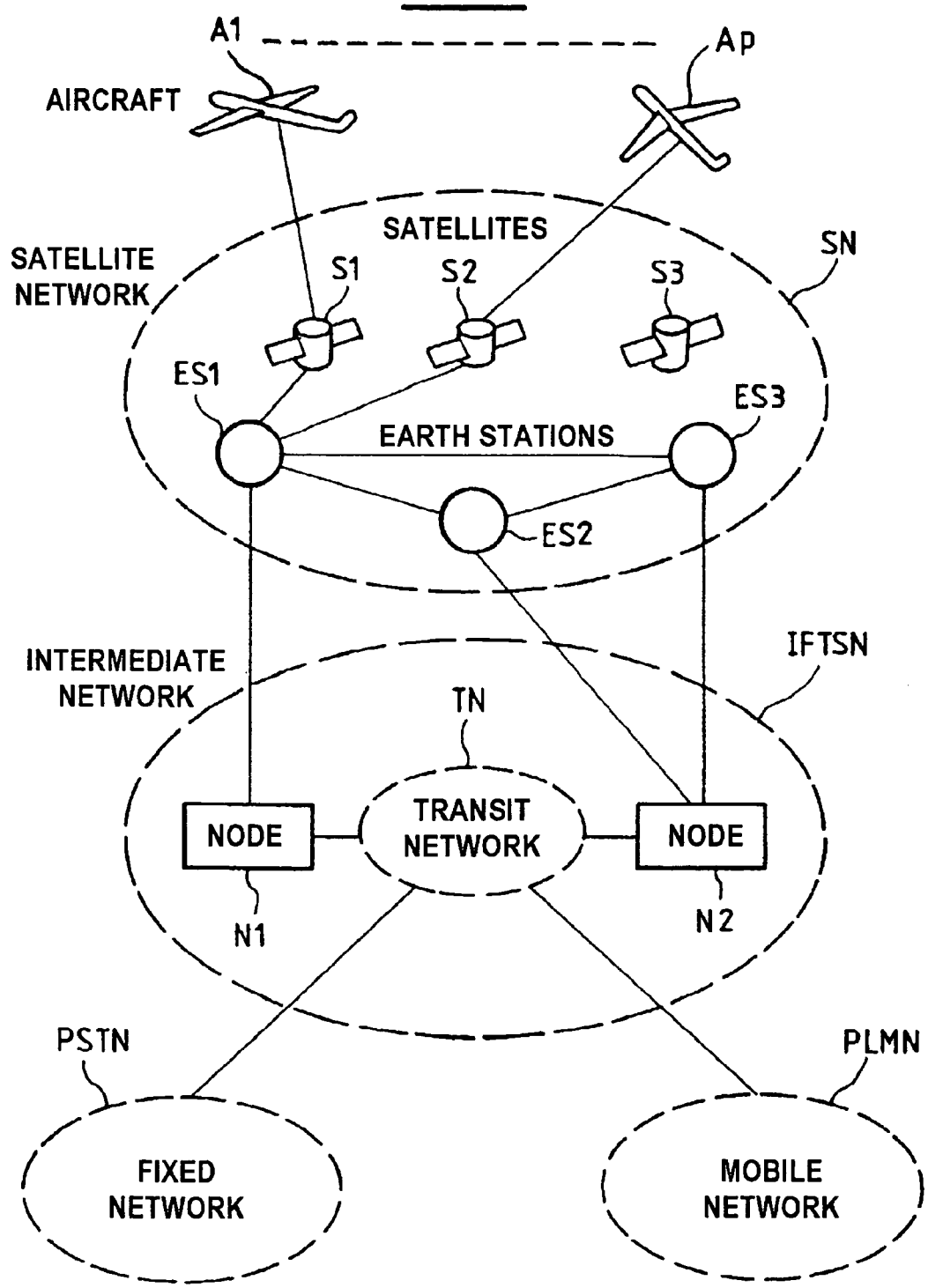

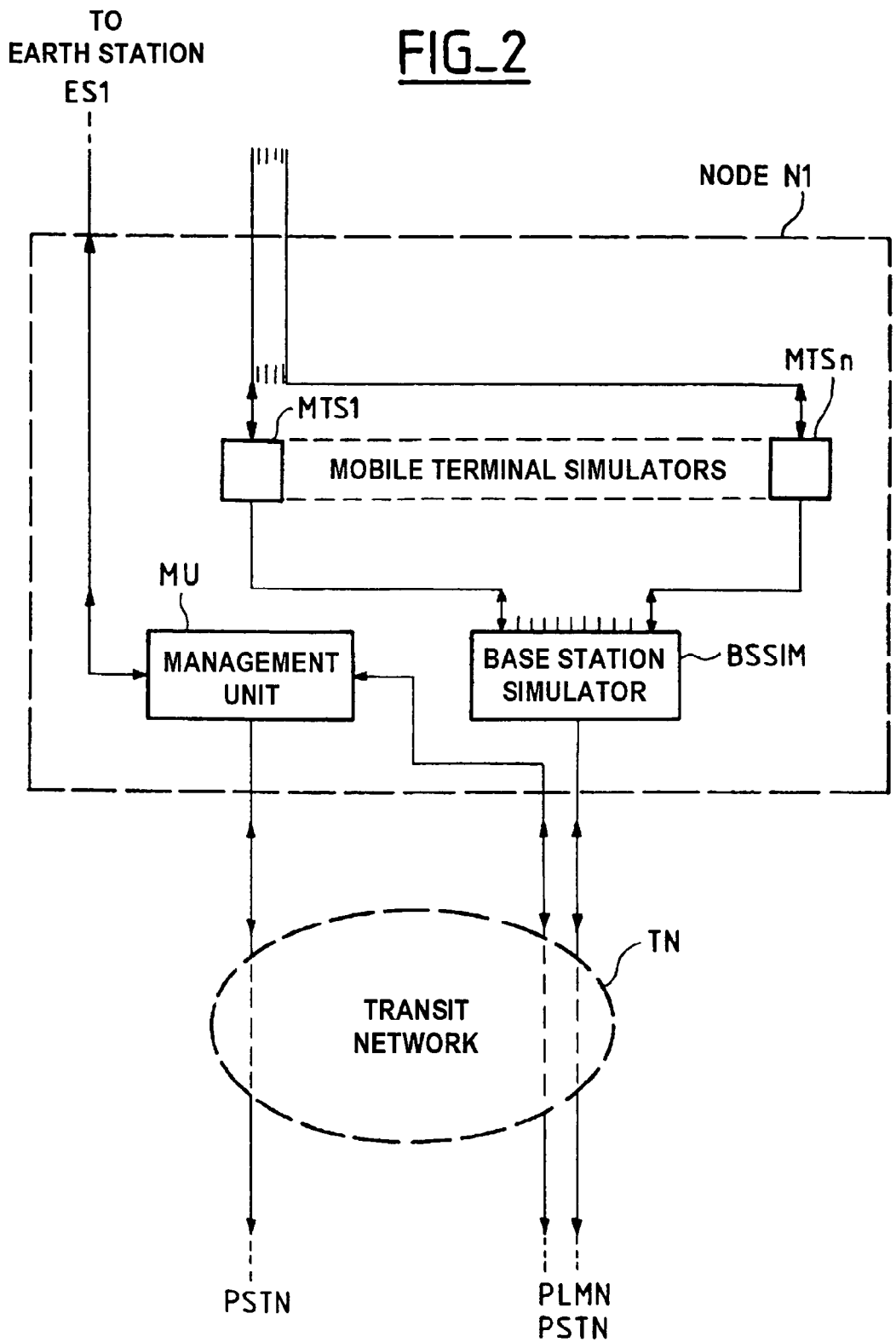

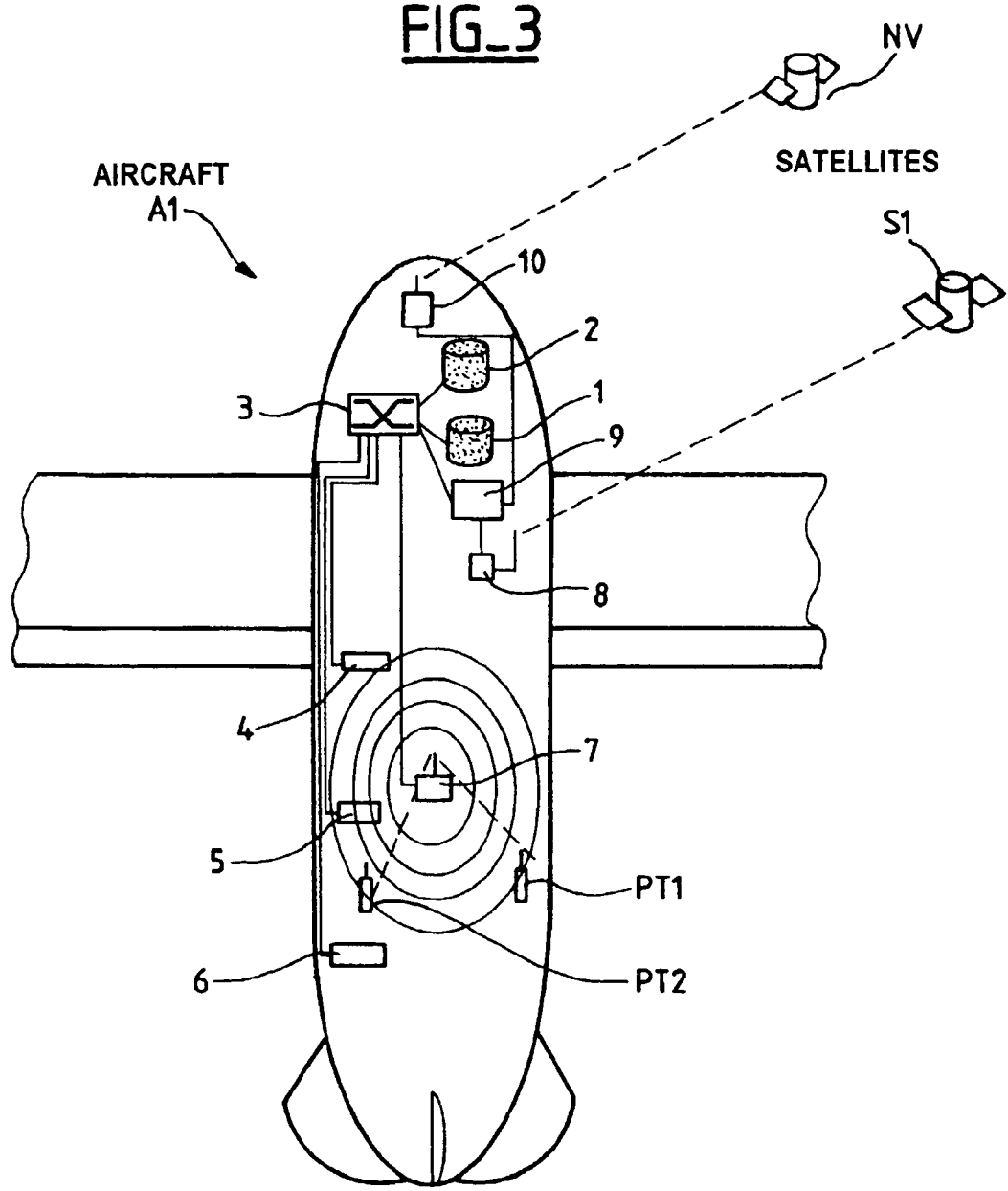

NODE AND ONBOARD STATION FOR SETTING UP AT ANY TIME A CALL INVOLVING A PASSENGER ON A VEHICLE

This is a divisional of application Ser. No. 09/537,568 filed Mar. 30, 2000; now U.S. Pat. No. 6,754,489 the disclosure of which is incorporated herein by reference.

BACKGROUND OF THE INVENTION

1. Field of the Invention

The invention relates principally to a system for setting up a call at any time involving a passenger on a vehicle. It is currently possible to set up a call at any time involving a person subscribing to a satellite mobile telephone network and having a portable terminal that can transmit and receive radio signals. It is not possible to use a portable terminal on board an aircraft, or other vehicles, whose walls block the radio signals.

2. Description of the Prior Art

Prior art systems enabling a telephone call to be set up from an aircraft to the ground cannot set up a telephone call from the ground to an aircraft because they are not able to locate a given passenger, even if they subscribe to a mobile telephone network. Also, these prior art systems use radio links with ground stations that serve only a small portion of the surface of the Earth. Furthermore, these prior art systems do not allow the use of standard mobile telephones, which many passengers possess. Nor do they allow the use of data terminals.

A first object of the invention is to propose a system enabling a telephone or data call to be set up at any time from the ground to a passenger on an aircraft, or vice versa.

SUMMARY OF THE INVENTION

The invention provides a node enabling a call involving a passenger on a vehicle to be set up at any time, the vehicle including an onboard station for connecting voice terminals and data terminals to a satellite network, and the node including an intermediate network including at least one node having means connected to the satellite network and to at least one terrestrial telecommunication network to associate a terrestrial telecommunication network directory number with a satellite network directory number for each passenger on the vehicle.

The above node enables a call to be set up to a passenger because it enables the satellite network to see the passenger as a subscriber of the satellite network, although this is not really the case, and because it enables a terrestrial mobile telephone network or a terrestrial fixed telephone network to see the passenger as a subscriber to a terrestrial network and to connect to them, although they are in fact inaccessible via the terminals of fixed networks and base stations of terrestrial mobile telephone networks for as long as they remain inside the vehicle.

In a prefered embodiment the node includes, for associating a terrestrial mobile telephone telecommunication network directory number with a satellite network directory number:

at least one base station simulator connected to the terrestrial mobile telephone network to simulate the behavior of a dummy base station of the terrestrial mobile telephone network, and n mobile terminal simulators connected to the base station simulator to simulate the behavior of n mobile terminals remaining at all times within the area of the base station and which correspond to n passengers in the vehicle, the n simulators being connected to the onboard station via the satellite network, being adapted to be called via the terrestrial mobile telephone network using the directory numbers of the n passengers, and retransmitting calls to n subscriber numbers of the satellite network respectively associated with the n directory numbers.

The above node enables a call to be set up to a passenger designated by their terrestrial mobile telephone network directory number because it enables the terrestrial mobile telephone network to see the passenger as a mobile subscriber even though they are in fact inaccessible via base stations of terrestrial mobile telephone networks for as long as they remain inside the vehicle.

The invention also provides an onboard station for setting up a call involving a passenger on a vehicle at any time, the station enabling voice terminals and data terminals in the vehicle to be connected to a satellite network which is in turn connected to a terrestrial mobile telephone network, which onboard station includes:

means for storing directory numbers of passengers in the vehicle who are subscribers to a terrestrial mobile telephone network and associating them with respective satellite network subscriber numbers, and means for routing a call to a passenger on the basis of a satellite network subscriber number used to route the call.

The above onboard station enables a telephone call to be set up at any time from the ground to a passenger on an aircraft because it enables the satellite network to see each passenger as a subscriber of the satellite network, although this is not really the case, and the passenger is in fact only a subscriber of a terrestrial mobile telephone network.

Another object of the invention is to propose a system enabling a carrier to charge for entertainment services on board a vehicle in a simple manner.

The invention further provides a system for billing entertainment services used by a passenger on board a vehicle, the system including:

means for storing a directory number of a passenger using the services and who is also a subscriber to a telecommunication network and for associating with the directory number an account for the entertainment services, and transmitter means for communicating a directory number and the amount to be charged to the corresponding passenger to a service point managing telephone billing of the telecommunication network, in order to bill the entertainment services with telephone services used by the passenger within the network to which they subscribe.

The above system automates billing and most importantly simplifies it for the carrier, as the carrier transfers the charge to a telephone network operator who routinely bills the passenger for telephone service.

Another object of the invention is to enable standard mobile telephones to be used on board aircraft whilst preventing a negligent or distracted passenger leaving their mobile telephone in operation during take-off and landing.

The invention also provides a system including means for receiving signals transmitted by a mobile telephone terminal in use, in order to detect the presence of a mobile telephone terminal in use, and means for giving an alarm if it detects such signals.

The invention will be better understood and other features will become apparent from the following description and the accompanying drawings.

BRIEF DESCRIPTION OF THE DRAWINGS

FIG. 1 a diagram illustrating the use of a system for communicating with aircraft and including nodes and onboard stations according to the invention.

FIG. 2 is a diagram showing one embodiment of a node according to the invention.

FIG. 3 is a diagram showing one embodiment of an onboard station according to the invention, installed on board an aircraft.

DETAILED DESCRIPTION OF THE PREFERRED EMBODIMENT

FIG. 1 is a diagram which illustrates the use of a system for communicating with passengers on aircraft, the system including nodes and local area networks according to the invention. To benefit from onboard telecommunication and entertainment services, a passenger must be accessible by means of a directory number. A number of methods for rendering the passenger accessible are described below. It is not essential for a passenger already to be a subscriber to a terrestrial mobile telephone or fixed telephone network.

The system essentially includes: an onboard station (not shown in FIG. 1) in each aircraft A1 to Ap, a telecommunication satellite network SN, of a type known in the art, having worldwide coverage, such as the Irridium network, and an intermediate network IFTSN which is interfaced to the satellite network SN, to a fixed telecommunication network PSTN and to a terrestrial mobile telephone network PLMN, for example of the GSM type.

The satellite network SN includes a constellation of satellites S1, S2, S3, etc, in moderately high orbit and earth stations ES1, ES2, ES3, etc. The onboard station of each aircraft A1 to Ap is in communication with a satellite at all times. Passengers make and receive calls via the satellite network SN. The satellite network sees each passenger involved in a call as a temporary dummy subscriber of the network SN. Thus the network SN manages roaming of passengers on the aircraft A1 to Ap able to telephone via the satellite network in the same manner as it manages roaming of any user employing an Irridium portable terminal anywhere on the surface of the Earth. The intermediate network IFTSN, the fixed network PSTN and the terrestrial mobile telephone network PLMN therefore do not have to manage roaming of the aircraft.

The intermediate network IFTSN includes a plurality of nodes N1, N2, etc, and a transit network TN connecting all the nodes to each other, to the fixed network PSTN and to the terrestrial mobile telephone network PLMN. The earth stations ES1, ES2, ES3 are connected to each other, the station ES1 is connected to the node N1 and the stations ES2 and ES3 are connected to the node N2. Each node N1, N2, etc is a gateway between the satellite network SN and the terrestrial networks PSTN and PLMN.

The network PLMN sees each node N1, N2, etc as a dummy base station and each passenger involved in a call as a dummy mobile subscriber of the network PLMN in the service area of one of the dummy base stations. The network PSTN sees each passenger involved in a call as a subscriber of another fixed network managed by another operator. The intermediate network IFTSN sees the network SN as a standard terrestrial mobile telephone network able to manage roaming of its subscribers itself.

Each aircraft has a group of subscriptions to the satellite network SN. The number of subscriptions fixes the number of passengers who can telephone simultaneously. Each passenger involved in a call is considered as a temporary dummy subscriber of the network SN, since it is the carrier who is the real and permanent subscriber to the satellite network SN.

In other embodiments of the invention, the intermediate network IFTSN can comprise only one node.

FIG. 2 is a diagram showing one embodiment of the node N1 in accordance with the invention. It includes:

at least one base station simulator BSSIM connected via the transit network TN to the terrestrial mobile telephone network PLMN to simulate the behavior of a base station of the terrestrial mobile telephone network, n mobile terminal simulators MTS1 to MTSn connected to the base station simulator BSSIM and to the earth station ES1 to simulate the behavior of n dummy mobile terminals of the network PLMN remaining at all times within the area of the dummy base station, the n simulators respectively corresponding to n passengers involved in a call, and a management unit MU for managing the node N1, connected to the earth station ES1 of the satellite network SN and interfaced to the networks PSTN and PLMN via the transit network TN.

The main function of the management unit MU is to associate n subscriber numbers of the satellite network SN with n passengers. Each passenger is designated by their real directory number, either that of a terrestrial mobile telephone network or that of a fixed telephone network. If a passenger is a subscriber to a terrestrial mobile telephone network, and if their subscription entitles them to the in-flight telephone service via the terrestrial mobile telephone network PLMN, the directory number of the passenger is further associated with one of the mobile terminal simulators MTS1 to MTSn.

Each mobile terminal simulator MTS1 to MTSn includes a processor and:

software for recording in the subscriber databases of the terrestrial mobile telephone network PLMN, at an address corresponding to the directory number of a passenger, the presence of a dummy mobile terminal in the coverage area of the dummy base station corresponding to the base station simulator BSSIM, in order to route all calls addressed to the passenger to that simulator, software for receiving a call set-up request from a passenger, submitting a call set-up request to the terrestrial mobile telephone network PLMN as if it originated from a mobile terminal of the terrestrial mobile telephone network PLMN, and then setting up a call with the aircraft carrying that passenger, via the satellite network SN, when the call has been set up in the terrestrial mobile telephone network PLMN, and software for requesting the satellite network SN to set up a call to a passenger, designated by their subscriber number in the satellite network SN, if the simulator receives a call from the network PLMN containing the directory number of the passenger.

The base station simulator BSSIM includes a processor and:

software for routing to a mobile terminal simulator MTSi all calls containing the directory number designating the passenger corresponding to that simulator, and software for routing to the network PLMN or the network PSTN all calls from the simulators MTS1 to MTSn addressed to one of those networks.

FIG. 3 is a diagram showing one embodiment of the onboard station according to the invention, the station being installed on board an aircraft A1, for example. The onboard station includes:

in-flight entertainment servers 1, 2 providing video on demand or general video, an Ethernet data frame switch 3, Ethernet data frame concentrators 4, 5, 6, etc connected to the switch 3 and to voice-data terminals integrated into the passenger seats, not shown, a "mini" GSM base station 7 radiating only into the cabin of the aircraft to enable passengers to use their usual GSM mobile telephones outside flight phases during which the use of mobile telephones is prohibited, a radio transceiver 8 for setting up a radio link to a satellite S1 of the satellite network SN, and a processor 9 connected to the transceiver 8 and serving as a gateway to the satellite network SN, which sees it as a group of dummy mobile subscribers of the network SN, each declared passenger retaining during the flight a subscriber number of the network SN associated with their usual directory number.

The voice-data terminals are preferably compatible with the Internet protocol and include a screen, an alphanumeric keyboard and a telephone handset or headset. They provide multiple services: telephone, Internet access, video on demand or general video, audio, cabin service.

On the assumption that the use of mobile telephones on board aircraft is allowed, possibly except during take-off and landing, the "mini" base station 7 is used to set up a link with GSM portable terminals. Thus passengers preferring to use their personal GSM mobile telephone terminal can use it, in particular to telephone. The "mini" base station 7 has a standard structure, enabling standard GSM mobile telephones to be used in the cabin of the aircraft. However, it also includes a system for detecting the presence of a GSM or other type mobile telephone in use in the cabin. This detector system can be activated by the cabin crew during take-off and landing, to signal such presence automatically (for example by means of an audible alarm device or by a prerecorded announcement). The system therefore enables effective enforcement of the prohibition on use of mobile telephone terminals during take-off and landing.

To be contactable, a passenger must register their presence via the processor 9 on board the aircraft and via the management unit of the node N1 which manages telecommunications with the aircraft. A number of methods can be used for this:

Passengers who have their personal GSM mobile telephone terminal with them can initiate registration of their presence on board by switching on their personal GSM mobile telephone terminal (not during take-off or landing). The "mini" base station 7 signals their presence to the processor 9 which then stores the directory number of the passenger in the local list, after which it transmits it to the management unit MU of a node of the intermediate network, for example node N1, for the latter to associate the directory number with a mobile terminal simulator.

Passengers who do not have their mobile telephone, or who do not wish to use it, or who are not authorized to use it, can initiate registration of their presence on board by switching on the voice-data terminal in front of them, choosing an option from a menu and entering their directory number, whether they are subscribers to a fixed network or to a terrestrial mobile telephone network, and provided that their subscription entitles them to use this on board aircraft telecommunication service. A reader for SIM cards (personal microchip cards normally inserted into a mobile telephone) can optionally be incorporated into each voice-data terminal to acquire the directory number automatically and to enable use of the personal directory stored on the card.

A passenger having no subscription to a terrestrial network, or not wishing to use it, can request a temporary subscription for the duration of the flight. The carrier either processes such subscriptions in its own billing center or sells passengers prepaid cards like the standard cards used in public telephones. The voice-data terminals must then include an appropriate card reader.

The directory number of each passenger can optionally be registered when their boarding card is checked. The checking is done by a machine. All that is required is for the machine to include a keypad enabling each passenger to enter their directory number. The machine simultaneously reads the seat number on the boarding card, which tells it which voice-data terminal the passenger could use.

In all cases, the processor 9 records the presence of these passengers in a list, designating each passenger by their directory number in the fixed network or the terrestrial mobile telephone network. It associates the directory number with:

an available number from the dummy subscriber numbers of the satellite network SN allocated to the aircraft concerned, a seat number (which designates the voice-data terminal the passenger can use), and an account of amounts due for entertainment services.

It charges all entertainment and telecommunication services used by the passenger to their telephone account via signaling links of the network SN and the intermediate network IFTSN. It uses the signaling transmission means of the satellite network SN, the intermediate network IFTSN and the terrestrial mobile telephone network PLMN to communicate the directory number and the charge to a service point managing telephone billing of the passenger concerned, so that entertainment services are billed at the same time as telephone services.

If the carrier offers temporary subscriptions without prepaid cards, the billing data is transmitted to a billing center of the carrier itself.

The management unit MU and the processor 9 communicate with each other to record the same call management data. At the end of the flight, the processor 9 automatically erases the records showing the presence of the passengers from its own memories and from the management unit MU of the node N1. The passengers can then receive new calls directly on their personal terminals from standard terrestrial mobile telephone networks.

This telecommunication system enabling a permanent link to be set up between the ground and an aircraft anywhere on the Earth can be used to constitute a system enabling air traffic controllers to locate an aircraft accurately anywhere on the Earth. As shown in FIG. 3, an aircraft A1 is provided with a GPS (Global Positioning System) receiver 10 able to determine the position of the aircraft very accurately by a method known in the art and based on receiving a plurality of signals transmitted by Navstar constellation satellites NV. The onboard network transmits the GPS position and time determined by the receiver 10.

The processor 9 is connected to the onboard network and includes software for sampling on the onboard network the GPS position and time with a very short period (for example every 500 milliseconds). The position is transmitted immediately to a traffic control center, with a time ticket, the speed vector of the aircraft and the identity of the aircraft, via the satellite network SN, the intermediate network IFTSN, and the fixed network PSTN. The GPS position is also used on board the aircraft for navigation.

To determine the position of the aircraft at the current time, the control center must correct the measured position by calculating the movement of the aircraft during the transmission, based on an estimate of its duration and the transmitted speed vector. Calculation errors in this correction of the measured position due to fluctuations in the transmission time are not negligible when those fluctuations are multiplied by a speed of 1000 kph, for example.

According to the invention, this source of inaccuracy is neutralized by transmitting the time ticket. The air traffic control center has a computer which determines the position at the current time by correcting the measured position as a function of the speed vector of the aircraft, the estimated transmission time and fluctuations therein, as noted. The center receives time tickets supplied directly by the GPS satellites. Time tickets received directly and retransmitted by the aircraft are compared to determine the transmission time and fluctuations therein.

It is therefore possible to track the aircraft and to predict its future flight path with great accuracy.

This system for determining a position can be applied to other types of vehicle able to move anywhere on the Earth, and can use a different transmission system provided that it covers all of the area in which the vehicle moves. It is not costly to install on board an aircraft, which already includes a GPS receiver and an onboard station according to the invention, since all that is required is to add the necessary software. The infrastructure on the ground is also not costly, although it offers worldwide coverage, because a non-dedicated transmission network can be used, transmission time fluctuations having no significant effect on accuracy.

The invention claimed is:

1. A system for billing non-telephone services used by a passenger on board a vehicle, said system comprising:
    means for storing a directory number of a passenger using said services and who is also a subscriber to a telecommunication network and for associating with said directory number an account for said services, and
    transmitter means for a communicating said directory number and an amount to be charged to the corresponding passenger to a service point managing telephone billing of said telecommunication network to bill said services used by said passenger to the subscribed telecommunications network.

2. The system claimed in claim 1 comprising means for receiving signals to detect the operation of a mobile telephone terminal, and means for giving an alarm if said means for receiving detects such signals.

3. The system claimed in claim 1, wherein said services comprise entertainment services.

4. A system for billing non-telephone services used by a passenger on board a vehicle, said system comprising:
    means for storing a number of a passenger using said services and which identifies said passenger to an entity which does not provide said services, and for associating with said number an account for said services, and
    transmitter means for communicating said number and an amount to be charged to the corresponding passenger to a service location managing billing of said entity to bill said services used by said passenger to said entity.

5. The system claimed in claim 4, wherein said services are entertainment services.

* * * * *